United States Patent
Kawanishi et al.

(10) Patent No.: US 7,421,209 B2
(45) Date of Patent: Sep. 2, 2008

(54) OPTICAL WAVELENGTH MULTIPLEXING FSK MODULATION METHOD

(75) Inventors: Tetsuya Kawanishi, Koganei (JP); Masayuki Izutsu, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 623 days.

(21) Appl. No.: 11/056,395

(22) Filed: Feb. 14, 2005

(65) Prior Publication Data

US 2005/0180761 A1    Aug. 18, 2005

(30) Foreign Application Priority Data

Feb. 16, 2004    (JP) ............................. 2004-039059

(51) Int. Cl.
*H04B 10/04*    (2006.01)

(52) U.S. Cl. .................. 398/183; 398/182; 398/184; 398/185; 398/186; 398/187; 398/188; 398/192; 398/193; 398/194; 398/200; 398/201; 398/202; 398/79; 398/81; 398/147; 398/158; 398/159; 398/91; 398/141; 398/140

(58) Field of Classification Search .................. 398/187, 398/189, 194, 147, 79, 81, 91, 141, 158, 398/159, 183, 186, 200, 188, 201, 192, 193, 398/182, 185, 202, 208
See application file for complete search history.

(56) References Cited

U.S. PATENT DOCUMENTS

| | | | | |
|---|---|---|---|---|
| 5,440,415 A | * | 8/1995 | Mekawi et al. ................. | 398/76 |
| 5,793,512 A | * | 8/1998 | Ryu ............................ | 398/97 |
| 2005/0111853 A1 | | 5/2005 | Kawanishi et al. | |

FOREIGN PATENT DOCUMENTS

JP    2005-134897    5/2005

\* cited by examiner

*Primary Examiner*—Hanh Phan
(74) *Attorney, Agent, or Firm*—Westerman, Hattori, Daniels & Adrian, LLP.

(57) ABSTRACT

An optical wavelength multiplexing frequency shift keying modulation system. The system includes an optical wavelength multiplexing signal acquisition unit for outputting an optical wavelength multiplexing signal. A n optical frequency shift keying modulation unit acquires an optical frequency shift keying signal, including an upper side band signal and a lower side band signal, by performing frequency modulation to the optical wavelength multiplexing signal output from the optical wavelength multiplexing signal acquisition unit. An optical frequency shift keying signal separation unit separates the optical frequency shift keying signal output from the optical frequency shift keying modulation unit into an upper side band signal and a lower side band signal.

37 Claims, 11 Drawing Sheets (a)

(b)

(a)

(b)

(a)

(b)

(a)

(b)

(c)

OPTICAL WAVELENGTH MULTIPLEXING FSK MODULATION METHOD

TECHNICAL FIELD

The present invention relates to an optical wavelength multiplexing/frequency shift keying (WDM/FSK) modulation system, an optical wavelength multiplexing FSK modulation method which obtains an optical WDM signal, an optical FSK modulated signal by using such a system, and the like.

DESCRIPTION OF RELATED ART

Frequency shift keying (FSK) is a technique that modulates a frequency of a signal to transmit a difference between frequencies as a signal. Since an FSK signal does not generally have amplitude information, the FSK signal is characteristically hard to be affected by level fluctuation or noise.

As a modulator which shifts a frequency of an optical signal to output the optical signal, there is an optical single side-band (optical SSB) modulator (T. Kawanishi, M. Izutsu, "Optical frequency shifter using optical SSB modulator", TECHNICAL REPORT OF IEICE, OCS2002-49, PS2002-33, OFT2002-30 (2002-08). A method of obtaining an optical FSK signal using the optical SSB modulator is known (T. Kawanishi and M. Izutsu, "Optical FSK modulator using an integrated lightwave circuit consisting of four optical phase modulator", CPT 2004 G-2, Tokyo, Japan, 14-16 Jan. 2004]).

In optical information communication, information communication using optical multiplexing is performed. Multiplexing is a technique that transmits information through one transmission path such that a large number of digital signals do not interfere with each other. As one of optical multiplexing techniques, WDM (Wavelength Division Multiplex: wavelength multiplexing transmission system) is known. In the WDM, a plurality of optical signals can be propagated through one transmission path such as an optical fiber (for example, Tasaki Kimirou, Nomura Masayuki, "Yasashiku Wakaru Tsushin Network" NIPPON JITSUGYO PUBLISHING CO., LTD., pp. 167 to 168, 2000). A WDM signal can be obtained by combining, for example, a plurality of E/O converters (electrical/optical converters) and a wavelength multiplexing circuit which couples output lights from the E/O converters (see the same reference, p. 168).

The FSK system and the WDM system using optical signals are known. However, a system obtained by combining the optical FSK and the optical WDM is not known.

Intensity modulation (IM) is known as a modulation system. As a system obtained by combining optical IM and optical FSK, a system having a function that separates an optical FSK signal and an optical IM signal and couples the separated optical IM signal to another optical FSK signal by using the interaction between optical signals having different wavelengths is known. For this purpose, different light sources are arranged at portions where the signals are separated from each other and coupled to each other. When the light sources are combined to the WDM system, the signals are separated into wavelength components and coupled to each other. However, a system which requires different light sources for coupling portions and which is obtained by combining optical IM and optical FSK is not known.

It is an object of the present invention to provide an optical wavelength multiplexing FSK modulation system obtained by combining optical FSK and optical WDM and a method of obtaining an optical WDM signal and an optical FSK modulated signal by using such a system.

It is another object of the present invention to provide an optical signal acquisition system which is obtained by optical FSK and optical IM with a simple arrangement.

SUMMARY OF THE INVENTION

[1] As an optical wavelength multiplexing frequency shift keying modulation system for solving at least one of the problems, there is provided an optical wavelength multiplexing frequency shift keying modulation system including: optical wavelength multiplexing signal acquisition means for outputting an optical wavelength multiplexing signal; optical frequency shift keying modulation means for acquiring an optical frequency shift keying signal including an upper side band signal and a lower side band signal by performing frequency modulation to the optical wavelength multiplexing signal output from the optical wavelength multiplexing signal acquisition means; and optical frequency shift keying signal separation means for separating the optical frequency shift keying signal output from the optical frequency shift keying modulation means into an upper side band signal and a lower side band signal; and wherein an optical wavelength multiplexing signal output from the optical wavelength multiplexing signal acquisition means is subjected to frequency modulation by the optical frequency shift keying modulation means to obtain an optical frequency shift keying signal, the optical frequency shift keying signal separation means separates the optical frequency shift keying signal into an upper side band signal and a lower side band signal to obtain an optical frequency shift keying modulation signal.

[2] The optical wavelength multiplexing frequency shift keying modulation system is preferably the optical wavelength multiplexing frequency shift keying modulation system described in item [1], including optical wavelength multiplexing signal demodulation means for demodulating the optical frequency shift keying signal output from the optical frequency shift keying modulation means into an optical wavelength multiplexing signal, and wherein the optical wavelength multiplexing demodulation means demodulates an optical wavelength multiplexing signal.

[3] The optical wavelength multiplexing frequency shift keying modulation system is preferably the optical wavelength multiplexing frequency shift keying modulation system described in item [2], wherein the optical wavelength multiplexing signal demodulation means including an optical filter which transmits light having a predetermined frequency, and when a frequency interval of optical wavelength multiplexing signals output from the optical wavelength multiplexing signal acquisition means is represented by $\Delta f_{WDM}$, when a band width of each optical wavelength multiplexing signal is represented by $2\Delta f_{WDMsig}$, and when a range of frequency modulation, or frequency deviation, performed by the optical frequency shift keying modulation means is represented by $\Delta f_{FSK}$, the optical filter composing the optical wavelength multiplexing signal demodulation means is a filter which transmits light of a frequency band in which a frequency shifts upward and downward by $(\Delta f_{WDM}sig+\Delta f_{FSK})$ from a center frequency of each optical wavelength multiplexing signal output from at least the optical wavelength multiplexing signal acquisition means.

[4] The optical wavelength multiplexing frequency shift keying modulation system is preferably the optical wavelength multiplexing frequency shift keying modulation system described in item [3], wherein the frequency interval between the optical wavelength multiplexing signals, the band width of each optical wavelength multiplexing signal, and the range of frequency modulation performed by the optical frequency shift keying modulation means satisfy the following relational expression (1):

<Numerical Expression 1>

$$\Delta f_{WDM} > \Delta f_{WDMsig} + \Delta f_{FSK} \quad (1)$$

[5] The optical wavelength multiplexing frequency shift keying modulation system is preferably the optical wavelength multiplexing frequency shift keying modulation system described in item [1], wherein the optical frequency shift keying signal separation means includes any one of upper side band signal separation means for separating an upper side band signal and lower side band signal separation means for separating a lower side band signal.

[6] The optical wavelength frequency shift keying modulation system is preferably the optical wavelength frequency shift keying modulation system described in [1], wherein the optical frequency shift keying signal separation means includes both an upper side band signal separation means for separating an upper side band signal and lower side band signal separation means for separating a lower side band signal.

[7] The optical wavelength multiplexing frequency shift keying modulation system is preferably the optical wavelength multiplexing frequency shift keying modulation system described in item [5] or item [6], wherein the upper side band signal separation means is a means which transmits light included in a predetermined region in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $+\Delta f_{FSK}$, and the lower side band signal separation means is a means which transmits light included in a predetermined region in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $-\Delta f_{FSK}$.

[8] The optical wavelength multiplexing frequency shift keying modulation system is preferably the optical wavelength multiplexing frequency shift keying modulation system described in item [5] or item [6], wherein the upper side band signal separation means is a means which transmits light in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $+\Delta f_{FSK}$, and the lower side band signal separation means is a means which transmits light in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $-\Delta f_{FSK}$.

[9] The optical wavelength multiplexing frequency shift keying modulation system is the optical wavelength multiplexing frequency shift keying modulation system described in item [1], wherein the optical frequency shift keying signal separation means includes an interleaver.

[10] As an optical wavelength multiplexing frequency shift keying modulation method for solving at least one of the problems, there is provided an optical wavelength multiplexing frequency shift keying modulation method including: the step of outputting an optical wavelength multiplexing signal; the step of performing frequency modulation to an optical wavelength multiplexing signal to obtain an optical frequency shift keying signal; the step of demodulating the optical frequency shift keying signal into an optical wavelength multiplexing signal to obtain an optical wavelength multiplexing signal; and the step of separating the optical frequency shift keying signal into an upper side band signal and a lower side band signal to obtain an optical FSK modulated signal.

[11] As an optical signal acquisition system for solving at least one of the above problems, there is provided an optical signal acquisition system including: light intensity modulation means for modulating an intensity of an optical signal from a laser light source; optical frequency shift keying modulation means for performing frequency modulation to an optical signal to obtain an optical frequency shift keying signal including an upper side band signal and a lower side band signal; double side band modulation means for performing double side band modulation to an intensity modulated/frequency shift keying modulated signal modulated by the light intensity modulation means and the optical frequency shift keying modulation means; and light intensity modulated signal separation means for separating a light intensity modulated signal component from an output signal from the double side band modulation means.

[12] The optical signal acquisition system is preferably the optical signal acquisition system described in item [11], wherein
an optical signal from the laser light source includes optical frequency multiplexing signals output from a plurality of laser light sources, and the light intensity modulation means is arranged for each optical wavelength multiplexing signal.

[13] The optical signal acquisition system is preferably the optical signal acquisition system described in [11], wherein
the double side band modulation means is any one of a double side band carrier wave suppression modulation means, phase modulation means, and intensity modulation means.

[14] The optical system acquisition system is preferably the optical system acquisition system described in item [11], wherein
when a modulation range of the optical frequency shift keying modulation means is represented by $\Delta f_{FSK}$, a modulation frequency, modulation range, of the double side band modulation means is $\Delta f_{FSK}$.

[15] The optical signal acquisition system is preferably the optical signal acquisition system described in item [11], wherein
the light intensity modulated signal separation means is an optical filter which transmits light in a predetermined region having, as a center frequency, a center frequency $f_0$ ($f_N$ which is a center frequency of each signal when the signal is a frequency multiplexing signal) of an optical signal from the laser light source.

[16] The optical signal acquisition system is preferably the optical signal acquisition system described in item [15], wherein
the optical filter is an optical filter having a band width equal to an occupied frequency band width of a light intensity signal.

[17] The optical signal acquisition system is preferably the optical signal acquisition system described in item [11], further including frequency shift keying demodulation means for demodulating a frequency shift keying modulation component of the intensity modulated/frequency shift keying modulated signal.

[18] The optical signal acquisition system is preferably the optical signal acquisition system described in item [11], including second optical frequency shift keying modulation means for performing frequency modulation to an optical signal output from the light intensity modulation signal separation means to obtain an optical frequency shift keying signal including an upper side band signal and a lower side band signal.

[19] An optical signal acquisition system for solving at least one of the above problems includes:

optical phase modulation means for modulating a phase of an optical signal from a laser source;

optical frequency shift keying modulation means for performing frequency modulation to the optical signal to obtain an optical frequency shift keying signal including an upper side band signal and a lower side band signal;

double side band modulation means for performing double side band modulation to a phase modulated/frequency shift keying modulated signal modulated by the optical phase modulation means and the optical frequency shift keying modulation means; and optical phase modulated signal separation means for separating an optical phase modulated signal component from an output signal from the double side band modulation means.

[20] The optical signal acquisition system is preferably the optical signal acquisition system described in item [19], wherein the optical signal from the laser light source is an optical wavelength multiplexing signal output from a plurality of laser light sources, and the optical phase modulation means is arranged for each of the optical wavelength multiplexing signals.

[21] The optical signal acquisition system is preferably the optical signal acquisition system described in item [19], wherein the double side band modulation means is any one of double side band carrier wave suppression modulation means, phase modulation means, and intensity modulation means.

[22] The optical signal acquisition system is preferably the optical signal acquisition system described in item [19], wherein when a modulation range of the optical frequency shift keying modulation means is represented by $\Delta f_{FSK}$, a modulation range of the double side band modulation is $\Delta f_{FSK}$.

[23] The optical signal acquisition system is preferably the optical signal acquisition system described in item [19], wherein the light intensity modulated signal separation means is an optical filter which transmits light in a predetermined region having, as a center frequency, a center frequency $f_0$ ($f_N$ when the signal is a frequency multiplexing signal) of an optical signal from the laser light source.

[24] The optical signal acquisition system is preferably the optical signal acquisition system described in item [23], wherein the optical filter is an optical filter having a band width equal to an occupied frequency band width of a light phase signal.

[25] The optical signal acquisition system is preferably the optical signal acquisition system described in item [19], further including frequency shift keying demodulation means for demodulating a frequency shift keying modulation component of the phase modulated/frequency shift keying modulated signal.

[26] The optical signal acquisition system is preferably the optical signal acquisition system described in item [19], including second optical frequency shift keying modulation means for performing frequency modulation to an optical signal output from the optical phase modulated signal separation means to obtain an optical frequency shift keying signal including an upper side band signal and a lower side band signal.

[27] As an optical signal acquisition system for solving at least one of the above problems, there is provided an optical signal acquisition system including:

light intensity modulation means for modulating an intensity of an optical signal from a laser light source;

optical frequency shift keying modulation means for performing frequency modulation to an optical signal to obtain an optical frequency shift keying signal including an upper side band signal and a lower side band signal;

double side band modulation means for performing double side band modulation to an intensity modulated/frequency shift keying modulated signal modulated by the light intensity modulation means and the optical frequency shift keying modulation means; and optical filter means for separating an output signal from the double side band modulation means.

[28] The optical signal acquisition system is preferably the optical signal acquisition system described in item [27], wherein an optical signal from the laser light source includes an optical wavelength multiplexing signals output from a plurality of laser light sources, and the light intensity modulation means is arranged for each of the optical wavelength multiplexing signals.

[29] The optical signal acquisition system is preferably the optical signal acquisition system described in item [27], wherein the double side band modulation means is any one of a double side band carrier wave suppression modulation means, phase modulation means, and intensity modulation means.

[30] The optical system acquisition system is preferably the optical system acquisition system described in item [27], wherein when a modulation range of the optical frequency shift keying modulation means is represented by $\Delta f_{FSK}$, a modulation range of the double side band modulation means is $\Delta f_{FSK}$.

[31] The optical signal system is preferably the optical signal system described in item [27], wherein in place of the light intensity modulation means, optical phase modulation means or optical phase modulation means and light intensity modulation means are used.

[32] The optical signal acquisition system is preferably the optical signal acquisition system described in item [27], wherein the optical filter means includes an optical filter which transmits light in a predetermined region having, as a center frequency, a center frequency $f_0$ ($f_N$ when the signal is a frequency multiplexing signal) of an optical signal from the laser light source.

[33] The optical signal acquisition system is preferably the optical signal acquisition system described in item [27], wherein the optical filter means is an optical filter having a band width equal to an occupied frequency band width of a light intensity signal of output light from the double side band modulation means.

[34] The optical signal acquisition system is preferably the optical signal acquisition system described in item [27], wherein the optical filter means is an optical filter which transmits a signal having a center frequency of $f_0$ ($f_N$ when the signal is a wavelength multiplexing signal) and any one or both of a signal having a center frequency of $f_0-2\Delta f_{FSK}$ ($f_N-2\Delta f_{FSK}$ when the signal is a wavelength multiplexing signal) and a signal having a center frequency of $f_0+2\Delta f_{FSK}$ ($f_N+2\Delta f_{FSK}$ when the signal is a wavelength multiplexing signal).

[35] The optical signal acquisition system is preferably the optical signal acquisition system described in item [27], further including frequency shift keying demodulation means for demodulating a frequency shift keying modulation component of the intensity modulated/frequency shift keying modulated signal.

[36] The optical signal acquisition system is preferably the optical signal acquisition system described in item [27], including second optical frequency shift keying modulation means for performing frequency modulation to an optical signal output from the light intensity modulated signal separation means to obtain an optical frequency shift keying signal including an upper side band signal and a lower side band signal.

[37] As an optical information communication system for solving at least one of the above problems, including:

an optical signal acquisition system according to any one of items [11] to [36];

branching means for branching an optical signal output from the optical signal acquisition system into optical signals depending on frequencies thereof;

a first photodetector for detecting one of the optical signals branched by the branching means;

a second photodetector for detecting the remaining one of the optical signals branched by the branching means; and a subtractor for calculating a difference between an output signal from the first photodetector and an output signal from the second photodetector.

According to the present invention, there can be provided an optical wavelength multiplexing FSK modulation system obtained by combining optical FSK and optical WDM and a method of obtaining an optical WDM signal and an optical FSK modulated signal by using such a system.

According to the present invention, there can also be provided an optical signal acquisition system obtained by combining optical FSK and optical IM (optical PM) with a simple arrangement.

BRIEF DESCRIPTION OF THE DRAWINGS

FIGS. 7A and 7B are diagrams to explain a frequency band in which a USB signal separation unit performs separation, wherein FIG. 7A is a diagram showing an optical FSK modulated signal of an optical WDM signal, and FIG. 7B is a diagram showing an optical USB signal separated by the USB signal separation unit.

FIG. 9 includes schematic views showing spectra of optical signals obtained after double side band carrier wave suppression (DSB-SC) modulation is performed, wherein FIG. 9A shows a spectrum obtained when an output in an optical FSK modulation step is a USB signal, and FIG. 9C shows a spectrum obtained when an output in an optical FSK modulation step is an LSB signal.

DETAILED DESCRIPTION OF THE PREFERRED EMBODIMENTS (1. Optical Wavelength Multiplexing FSK Modulation System)

An optical wavelength multiplexing FSK modulation system according to the present invention is based on such knowledge that an optical WDM signal is demodulated by an optical WDM signal demodulation unit and an optical FSK signal is separated into a USB light and an LSB signal by using an optical FSK signal separation means such as an interleaver to make it possible to obtain an optical WDM signal and an optical FSK signal. A concrete example of an optical WDM-FSK modulation system according to the present invention will be described below with reference to the accompanying drawings.

(1.1. Outline of Optical Wavelength Multiplexing FSK Modulation System)

Figure 1:
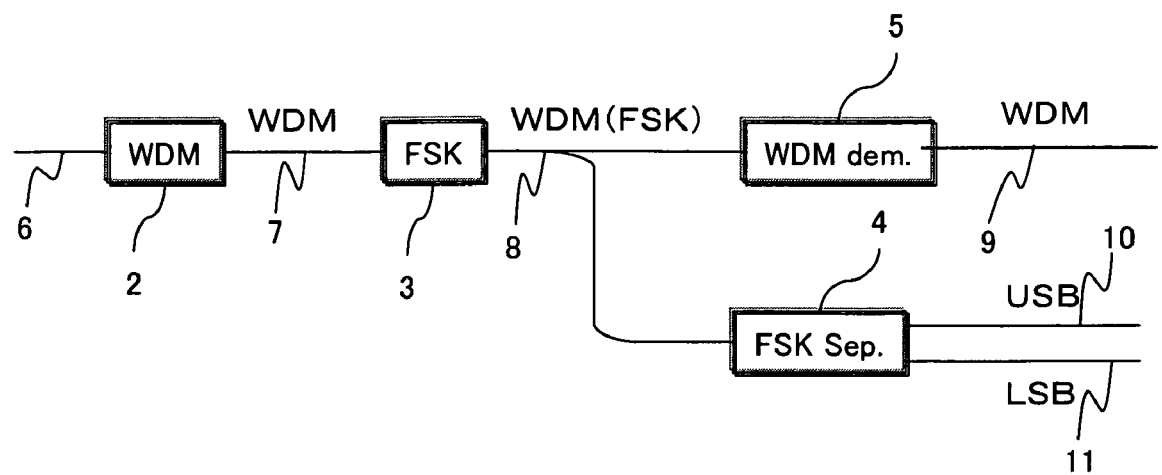
FIG. 1 is a schematic view showing a basic arrangement of an optical wavelength multiplexing FSK modulation system according to the present invention.

FIG. 1 is a schematic diagram showing the basic arrangement of an optical wavelength multiplexing FSK modulation system according to the present invention. As shown in FIG. 1, an optical wavelength multiplexing FSK modulation system 1 according to the present invention includes a WDM signal acquisition unit 2, an optical FSK modulation unit 3, and an optical FSK signal separation unit 4. The optical wavelength multiplexing FSK modulation system 1 preferably includes an optical WDM signal demodulation unit 5. In FIG. 1, reference numeral 6 denotes a signal path such as a line which transmits an electric signal input to an optical WDM signal acquisition unit; 7 denotes an optical path which connects the WDM signal acquisition unit 2 to the optical FSK modulation unit 3; 8 denotes an optical path which connects the optical FSK modulation unit 3 to the optical WDM signal demodulation unit 5 and the optical FSK signal separation unit 4; 9 denotes a communication path to which an optical WDM signal is output; 10 denotes a communication path to which a USB signal is output; and 11 denotes a communication path to which an LSB signal is output. An optical branching unit (not shown) may be arranged on the optical path 8.

This system basically operates as follows. More specifically, the WDM signal acquisition unit 2 outputs an optical WDM signal. Thereafter, the optical FSK modulation unit 3 performs frequency modulation to the WDM signal to obtain an optical FSK signal. Then, the optical WDM signal demodulation unit 5 demodulates the optical FSK signal into an optical WDM signal. At the same time, the optical FSK signal separation unit 4 separates the optical FSK signal into a USB signal and an LSB signal. In this manner, the optical WDM/FSK modulation system according to the present invention obtains one or both of the optical WDM signal and the optical FSK signal. Components constituting the optical WDM/FSK modulation system according to the present invention will be described below.

(1.2. Optical Wavelength Multiplexing Signal Acquisition Unit)

Figure 2:
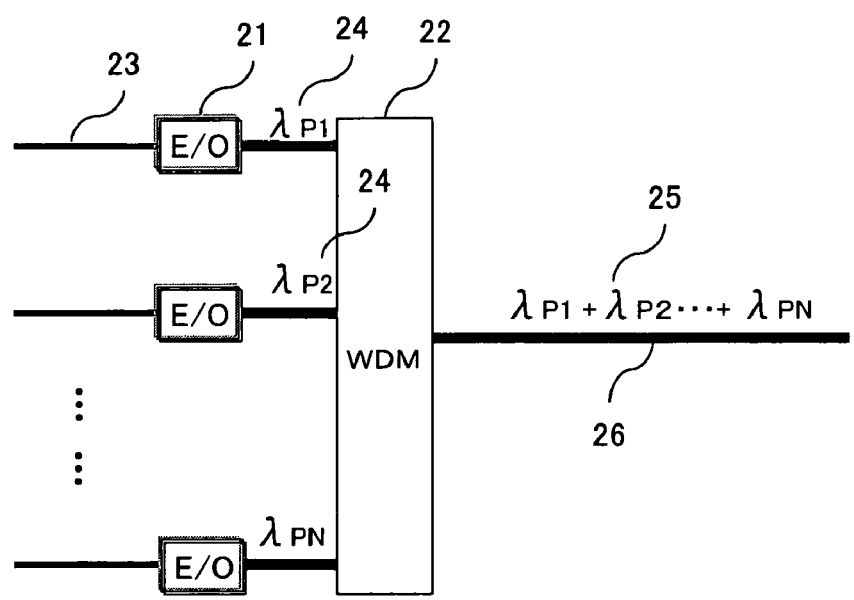
FIG. 2 is a schematic view showing a basic arrangement of an optical WDM signal acquisition unit.

The WDM signal acquisition unit 2 is a unit to output an optical wavelength multiplexing signal. As described above, the optical WDM technique is known. As the WDM signal acquisition unit 2, a known optical WDM signal acquisition means can be used. FIG. 2 is a schematic diagram showing a basic arrangement of the optical WDM signal acquisition unit. As shown in FIG. 2, as the optical WDM signal acquisition unit 2, there is an optical WDM signal acquisition unit including a plurality of E/Os (Electric/Optical converter) 21 and a wavelength multiplexing circuit (WDM) 22 which bundles output lights from the E/Os (K. Tasaki and M. Nomura, "Yasashiku Wakaru Tsushin Network" issued by NIPPON JITSUGYO PUBLISHING CO., LTD., p. 168, 2000). More specifically, the E/Os convert a plurality of electric signals 23 into optical signals ($\lambda_{P1}, \lambda_{P2}, \ldots, \lambda_{PN}$) 24 having different wavelengths. A wavelength multiplexing circuit (WDM) bundles this plurality of optical signals to output a bundle of optical signals ($\lambda_{P1}+\lambda_{P2}\ldots+\lambda_{PN}$) 25, and outputs the bundle to one communication path 26 constituted by an optical fiber. In this manner, the optical WDM signal can be obtained. As a wavelength multiplexing circuit, there is an array waveguide diffraction grating (AWG) or the like.

Figure 3:
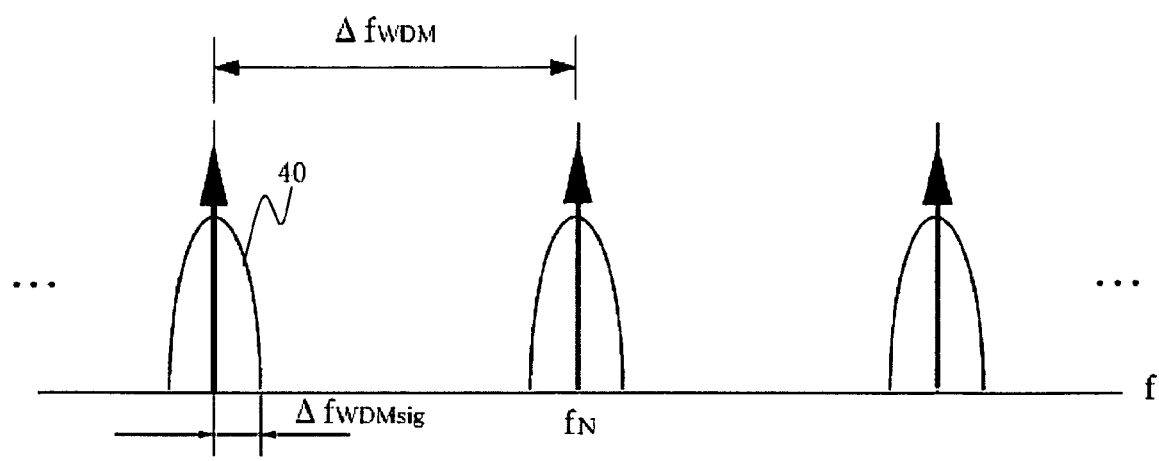
FIG. 3 is a diagram showing an example of an output signal from the WDM signal acquisition unit.

FIG. 3 is a diagram showing an example of an output signal from the optical WDM signal acquisition unit. As shown in FIG. 3, in this specification, a frequency interval between optical WDM signals 40 is set at $\Delta f_{WDM}$, and a bandwidth of each WDM signal is set at $2\Delta F_{WDMsig}$, and a center frequency of each optical WDM signal is set at $f_N$. The optical WDM signals are not limited to optical WDM signals having a predetermined frequency interval as shown in FIG. 3.

(1.3. Optical Frequency Shift Keying Modulation Unit)

The optical FSK modulation unit 3 is a unit that performs frequency modulation to an optical WDM signal output from the optical WDM signal acquisition unit to obtain an optical frequency shift keying signal. As the optical FSK modulation unit 3, there is an optical SSB modulator or an optical FSK modulator.

(1.3.1. Optical SSB Modulator)

Figure 4:
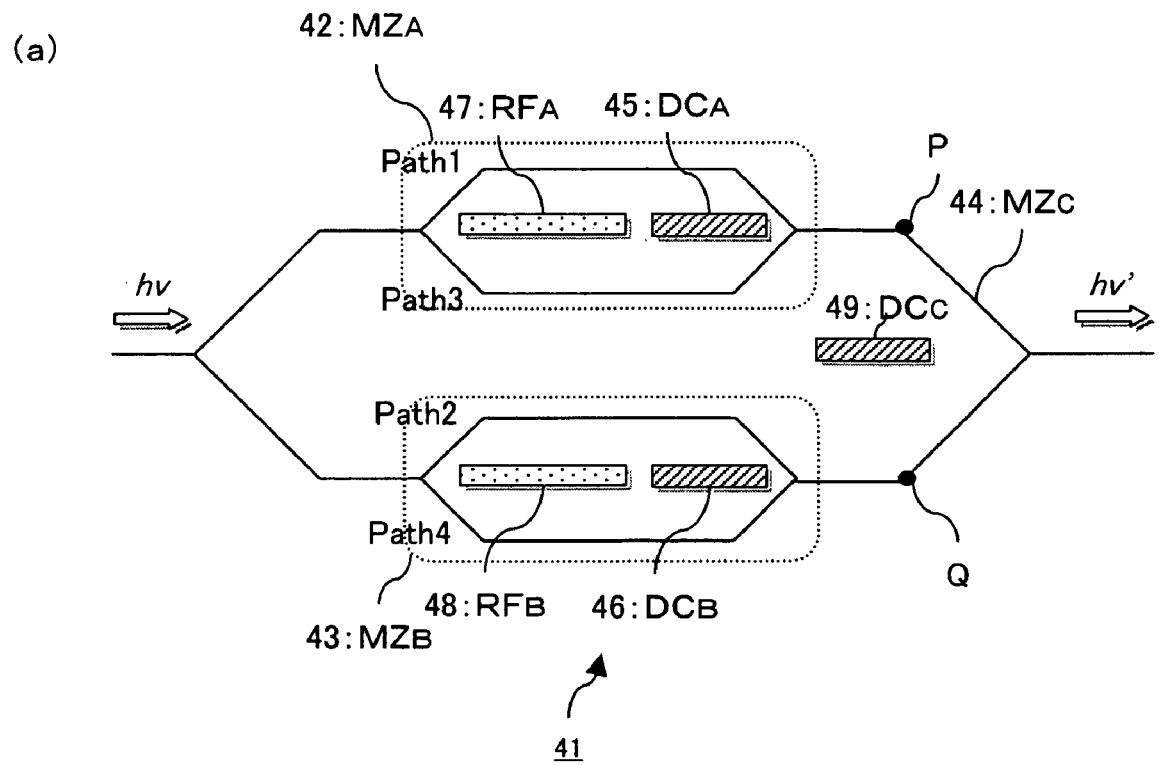
FIG. 4A is a schematic view showing a basic arrangement of an optical SSB modulator.
FIG. 4B is a schematic view showing a basic arrangement of the optical SSB modulator shown in FIG. 4A and having an RF electrode serving as an electrode for an RF signal and an electrode for a DC signal.
Figure 4:
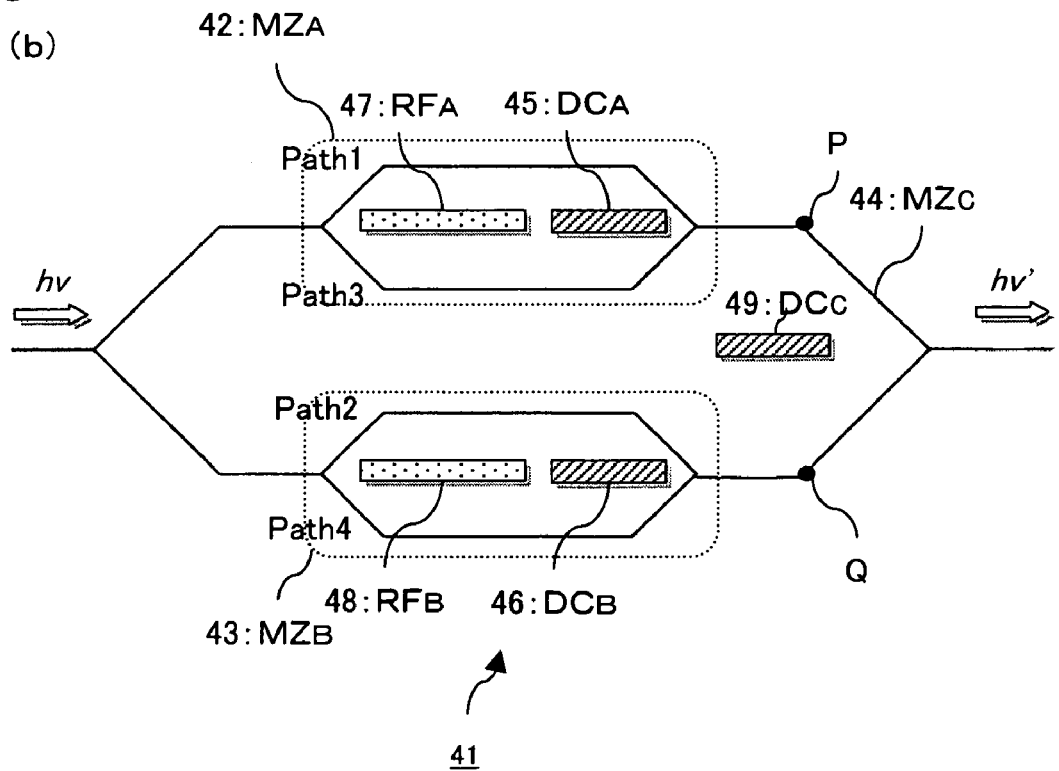

FIGS. 4A and 4B are schematic diagrams showing the basic arrangement of an optical SSB modulator. As shown in FIG. 4A, an optical SSB modulator 41 includes a first sub-Mach-Zehnder waveguide ($MZ_A$) 42, a second sub-Mach-Zehnder waveguide ($MZ_B$) 43, a main Mach-Zehnder waveguide ($MZ_C$) 44, a first bias adjustment electrode ($DC_A$ electrode) 45, a second bias adjustment electrode ($DC_B$ electrode) 46, a first modulation electrode ($RF_A$ electrode) 47, a second modulation electrode ($RF_B$ electrode) 48, and a third bias adjustment electrode ($DC_C$ electrode) 49.

In this case, the main Mach-Zehnder waveguide ($MZ_C$) 44 is a Mach-Zehnder waveguide including the $MZ_A$ and the $MZ_B$ as both arms.

The first bias adjustment electrode ($DC_A$ electrode) 45 is an electrode that controls a bias voltage between the two arms (Path1 and Path3) composing the $MZ_A$ to control a phase of light propagating between the two arms of the $MZ_A$. On the other hand, the second bias adjustment electrode ($DC_B$ electrode) 46 is an electrode that controls a bias voltage between the two arms (Path2 and Path4) composing the $MZ_B$ to control a phase of light propagating between the two arms of the $MZ_B$. The $DC_A$ electrode and the $DC_B$ electrode are preferably DC electrodes or low-frequency electrodes in general. The "low frequency" of the low-frequency electrode means a frequency of, for example, 0 Hz to 500 MHz.

The first modulation electrode ($RF_A$ electrode) 47 is an electrode to input a radio-frequency (RF) signal to the two arms composing the $MZ_A$. On the other hand, the second modulation electrode ($RF_B$ electrode) 48 is an electrode to input an RF signal to the two arms composing the $MZ_B$. As the $RF_A$ electrode and the $RF_B$ electrode, there are traveling-wave-type electrodes or resonant-type electrodes. Preferably, the resonant-type electrodes are used.

The $RF_A$ electrode and the $RF_B$ electrode are connected to a high-frequency electric signal source. The high-frequency electric signal source is a device to control a signal transmitted to the $RF_A$ electrode and the $RF_B$ electrode. As the high-frequency electric signal source, a known high-frequency electric signal source can be adopted. As a frequency ($f_m$ or $f_{FSK}$) of a high-frequency signal input to the $RF_A$ electrode and the $RF_B$ electrode, for example, a frequency of 1 GHz to 100 GHz is mentioned. As an output from the high-frequency electric signal source, a sinusoidal wave having a predetermined frequency is mentioned.

The $RF_A$ electrode and the $RF_B$ electrode consist of, for example, gold, platinum, or the like. As the widths of the $RF_A$ electrode and the $RF_B$ electrode, widths of 1 μm to 10 μm are mentioned. More specifically, widths of 5 μm are mentioned. As the lengths of the $RF_A$ electrode and the $RF_B$ electrode, lengths which are 0.1 to 0.9 times the wavelength ($f_m$) of a modulated signal or lengths which are 0.18 to 0.22 times or 0.67 to 0.70 times are mentioned, more particularly, lengths which are 20 to 25% shorter than a resonance point of the modulated signal are mentioned. When these lengths are employed, a coupled impedance between the electrodes and a stab electrode falls within an appropriate range. As more concrete lengths of the $RF_A$ electrode and the $RF_B$ electrode RB, lengths of 3250 μm are mentioned. A resonant-type electrode and a traveling-wave-type electrode will be described below.

A resonant-type optical electrode (resonant-type optical modulator) is an electrode that performs modulation by using resonance of a modulated signal. As the resonant-type electrode, a known resonant-type electrode can be adapted. For example, a resonant-type electrode described in Japanese Patent Application Laid-Open No. 2002-268025, "T. Kawanishi, S. Oikawa, M. Izutsu, "Optical Modulator with Planar Structure", TECHNICAL REPORT OF IEICE, IQE2001-3 (2001-05)" can be adopted.

The traveling-wave-type electrode (traveling-wave-type optical modulator) is an electrode (modulator) that guides an optical wave and an electric signal in the same direction and modulates light while the optical wave and the electric signal are guided (e.g., Hiroshi Nishihara, Haruna Masamitsu, Toshiaki Suhara, "optical integrated circuit" (revised and updated edition), Ohmsha, pages 119 to 120). A known traveling-wave-type electrode such as those disclosed in Japanese Patent Application Laid-Open Nos. 11-295674, 2002-16133, 2002-40381, 2000-267056, 2000-47159, and 10-133159, for example, can be used as the traveling-wave-type electrode.

A preferable traveling-wave-type electrode adopting a so-called symmetrical-type earth electrode arrangement (one provided with at least a pair of earth electrodes on both sides of a traveling-wave-type signal electrode) is mentioned. Thus, by symmetrically arranging the earth electrodes sandwiching the signal electrode, a high frequency wave output from the signal electrode is made easy to be impressed to the earth electrodes arranged on the left and right of the signal electrode, thereby suppressing an emission of the high frequency wave to the side of the substrate.

The third bias adjustment electrode ($DC_C$ electrode) 49 is an electrode that controls a bias voltage between the $MZ_A$ and the $MZ_B$ to control a phase of light propagating between the $MZ_A$ and the $MZ_B$. The third bias adjustment electrode ($DC_C$ electrode) is a DC or low-frequency electrode, for example.

(1.3.2. Another Mode of Optical SSB Modulator)

As shown in FIG. 4B, in the optical SSB modulator, the RF electrode may serve as an electrode for an RF signal and an electrode for a DC signal. More specifically, one or both of the $RF_A$ electrode and the $RF_B$ electrode are connected to a power supply circuit (bias circuit) which mixes the DC signal and the RF signal to supply the mixed signal. The optical SSB modulator of the mode can function like the optical SSB modulator described above because the RF electrode is connected to the power supply circuit (bias circuit) to make it possible to input an RF signal (radio-frequency signal) and a DC signal (DC signal: signal related to a bias voltage) to the RF electrode.

(1.3.3. Operation of Optical SSB Modulator)

An operation of an optical SSB modulator is closely reported in, for example, T. Kawanishi, M. Izutsu, "Optical frequency shifter using optical SSB modulator", TECHNICAL REPORT OF IEICE, OCS2002-49, PS2002-33, OFT2002-30 (2002-08), Higuma et al., X-cut lithium niobium optical SSB modulator, electron letter, vol. 37, pp. 515 to 516 (2001), and the like. More specifically, according to the optical SSB modulator, an upper side band signal (USB) and a lower side band signal (LSB), the frequencies of which shift in plus direction by specified quantities, can be obtained.

(1.3.4. Optical FSK Modulator)

An optical FSK modulator is obtained such that an electrode corresponding to the $DC_C$ electrode of the optical SSB modulator is replaced with an RF (radio-frequency) electrode or a bias adjustment electrode and an RF electrode to realize high-speed switching of signs. As an optical FSK modulator using only the RF electrode, a modulator in which an RF electrode is connected to a power supply circuit (bias circuit) which mixes a DC signal and an RF signal to supply the mixed signal is adopted. As the RF electrode, a traveling-wave-type electrode corresponding to high-speed switching can be preferably used. In this case, the RF electrode is an electrode corresponding an input/output operation of an RF frequency. Also in the FSK modulator, signal voltages of an $RF_C$ are switched to make it possible to output an upper side band component and a lower side band component while switching the components.

(1.3.5. Output from Optical FSK Modulation Unit)

Figure 5:
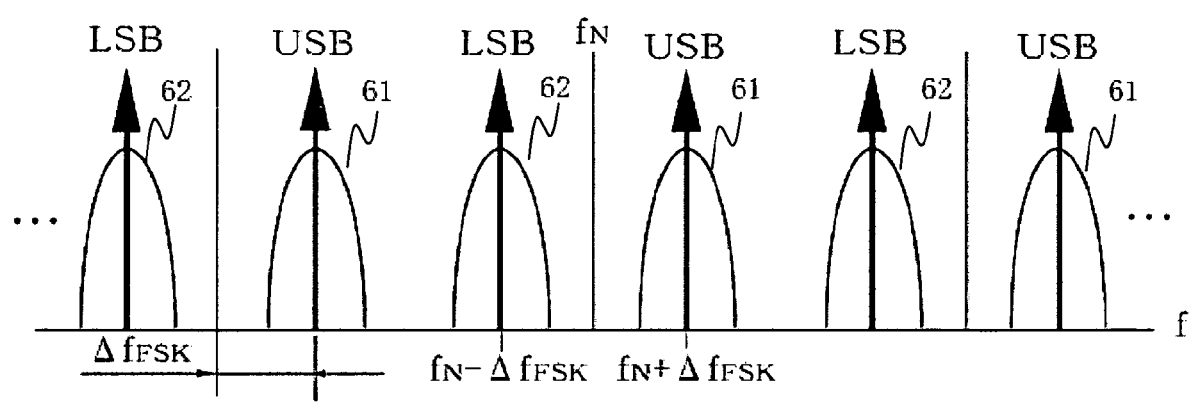
FIG. 5 is a conceptual view showing an output from the optical FSK modulation unit.

FIG. 5 is a conceptual diagram showing an output from an optical FSK modulation unit. An optical FSK signal consists of an upper side band (USB) signal 61 and a lower side band (LSB) signal 62. As shown in FIG. 5, a center frequency of each optical WDM signal is given by $f_N$, a center frequency of the USB signal is $f_N+\Delta f_{FSK}$, and a center frequency of the LSB signal is $f_N-\Delta f_{FSK}$.

(1.4. Optical Wavelength Multiplexing signal Demodulation Unit)

The optical WDM signal demodulation unit 5 is a unit to demodulate an optical frequency shift keying signal output from the optical FSK modulation unit into an optical wavelength multiplexing signal.

Figure 6:
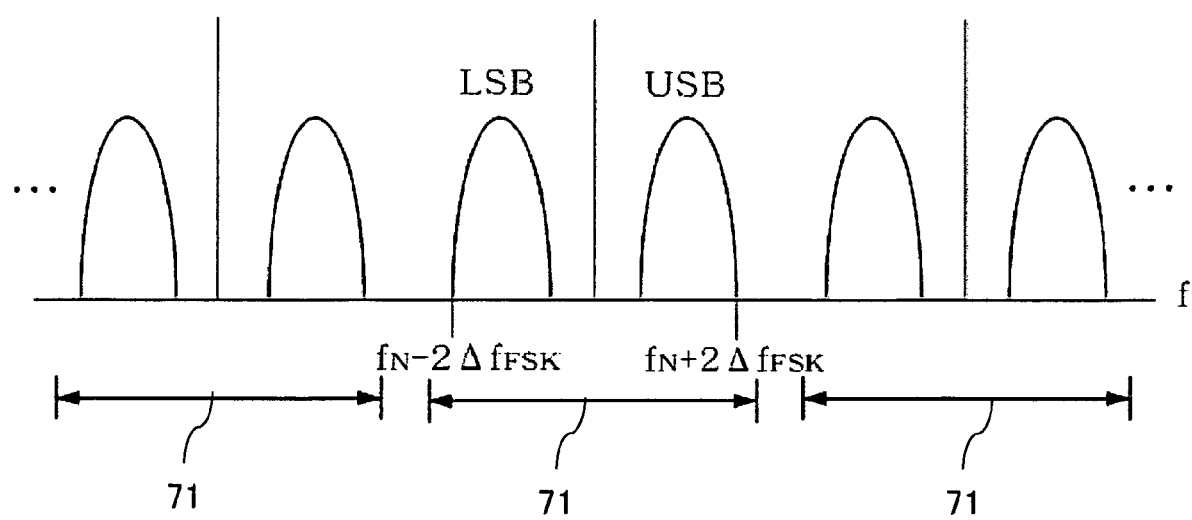
FIG. 6 is a schematic view showing an example of a transmitting frequency band of such an optical filter.

As the optical WDM signal demodulation unit 5, one including an optical filter which transmits light having a predetermined frequency is adopted. FIG. 6 is a schematic diagram showing an example of a transmission frequency band of such an optical filter. As is defined above, a center frequency of an optical WDM signal is set at $f_N$, a frequency interval of the optical WDM signal is set at $\Delta f_{WDM}$, a bandwidth of each optical WDM signal is set at $2\Delta f_{WDMsig}$, and a range of frequency modulation performed by the optical FSK modulation unit is set at $\Delta f_{FSK}$. As shown in FIG. 6, as a transmission band 71 of the optical filter, a band including a frequency band in which a frequency upwardly and downwardly shifts from at least $f_N$ by ($\Delta f_{WDMsig}+\Delta f_{FSK}$) is adopted. By using the optical filter having such transmission characteristics, USB signals and LSB signals for each optical WDM signal modulated by the optical FSK modulation unit can be integrated for the corresponding optical WDM signal. For this reason, the optical WDM signal can be demodulated.

Note that $\Delta F_{WDM}$, $\Delta f_{WDMsig}$, and $\Delta f_{FSK}$ preferably satisfy the following relationship. This is because the optical WDM signal is appropriately demodulated when the following relationship is satisfied.

<Numerical Expression 3>

$$\Delta f_{WDM} > \Delta f_{WDMsig} + \Delta f_{FSK}$$

(1.5. Optical Frequency Shift Keying Signal Separation Unit)

The optical FSK signal separation unit 4 is a unit that separates an optical FSK signal output from the optical FSK modulation unit into a USB signal and an LSB signal. The optical FSK signal separation unit 4, a unit having any one or both of a USB signal separation unit and an LSB signal separation unit is adopted. More specifically, in order to separate the optical FSK signal, any one of the USB signal and the LSB signal may be used. Both the signals are extracted to make it possible to improve an S/N ratio.

(1.5.1. USB Signal Separation Unit)

Figure 7:
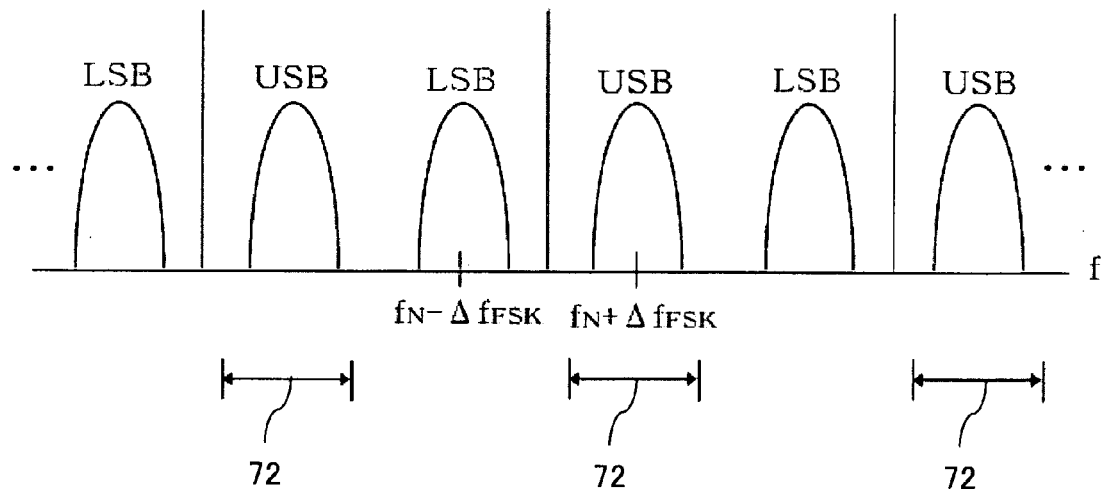
Figure 7:
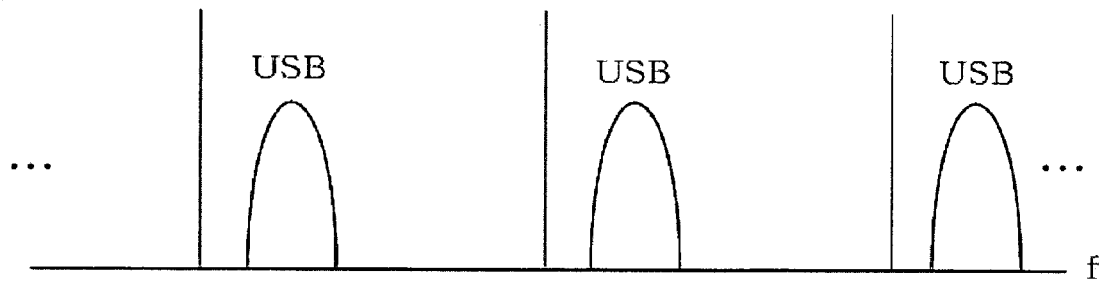

FIGS. 7A and 7B are diagrams for explaining frequency bands in which the USB signal separation unit separates a USB signal. FIG. 7A is a diagram showing an optical FSK modulated signal of the optical WDM signal. FIG. 7B is a diagram showing an optical USB signal separated by the USB signal separation unit. In FIG. 7A, reference numeral 72 denotes a frequency band in which the USB signal separation unit separates a USB signal. As shown in FIG. 7A, as the USB signal separation unit, a unit (optical filter or the like) that transmits light of a band including a frequency band in which a frequency upwardly and downwardly shifts from a center frequency of $f_N+\Delta f_{FSK}$ by $\Delta f_{WDMsig}$ is adopted. Since the optical filter has such band filter characteristics, an output as shown in FIG. 7B can be obtained. More specifically, a USB signal can be obtained by the USB signal separation unit. As the USB signal separation unit, a unit that transmits light in a predetermined region in a frequency band in which a frequency upwardly and downwardly shifts from at least a center frequency $f_N+\Delta f_{FSK}$ by $\Delta f_{WDMsig}$ may be adopted. In the USB signal separation unit having such characteristics, a USB signal cannot be completely extracted. This is because, when a USB signal can be extracted with a certain level of intensity, an optical FSK signal can be demodulated.

(1.5.2. LSB Signal Separation Unit)

An LSB signal separation unit can also be basically considered like the USB signal separation unit. More specifically, as the LSB signal separation unit, a unit that transmits light of a band including a frequency band in which a frequency upwardly and downwardly shifts from a center frequency of $f_N-\Delta f_{FSK}$ by $\Delta f_{WDMsig}$ is adopted. As the LSB signal separation unit, a unit that transmits light in a predetermined region in a frequency band in which a frequency upwardly and downwardly shifts from at least a center frequency $f_N-\Delta f_{FSK}$ by $\Delta f_{WDMsig}$ may be adopted. In the LSB signal separation unit having such characteristics, a LSB signal cannot be completely extracted. This is because, when a LSB signal can be extracted with a certain level of intensity, an optical FSK signal can be demodulated.

(1.5.3. Interleaver)

As the optical FSK signal separation unit, an interleaver is concretely adopted. The interleaver is a device having the following characteristic feature. That is, an incident wavelength multiplexing optical signal is branched into two pairs of signal sequences each having a wavelength interval which is twice the wavelength interval of the wavelength multiplexing optical signal, the two pairs of wavelength multiplexing signals are coupled into one signal sequence having a wavelength interval which is half the wavelength interval of the wavelength multiplexing signal. According to the interleaver, since a sharp signal passing wavelength band can be obtained, signals of adjacent channels can be reliably separated from each other, and communication quality can be prevented from being deteriorated by mixing another wavelength.

As the interleaver, a fiber-type interleaver including a plurality of fiber couplers, a multilayered-film-type interleaver including a multilayered film and a prism, a birefringent-plate-type interleaver including a birefringent plate and a polarized wave separation element, or a waveguide-type interleaver using a waveguide is adopted.

More specifically, interleavers such as Nova-Interleavers are available from Optoplex Corporation and OC-192 and OC-768 available from NEXFON CORPORATION.

(1.6. Other)

Although not especially shown, an optical amplifier is preferably arranged on an output path extending from the optical FSK signal separation unit 4. An optical signal output from the optical FSK signal separation unit 4 such as an interleaver may decrease in amplitude. Therefore, when the amplitude is recovered by the optical amplifier, the optical signal can be applied to long-distance communication. Such an optical amplifier is preferably arranged for each of a USB signal and an LSB signal.

(1.7. Example of Frequency Band)

As examples of $\Delta f_{WDM}$, $\Delta f_{FSK}$, and $\Delta_{WDMsig}$, the following values are mentioned.

(1.7.1. Example 1 of Frequency Band)

As an example of an optical wavelength multiplexing FSK modulation system according to the present invention, an optical wavelength multiplexing FSK modulation system having $\Delta f_{WDM}$: 100 GHz, $\Delta f_{FSK}$: 25 GHz, and $\Delta f_{WDMsig}$: 10 GHz is adopted. In such a system, an optical WDM acquisition unit including a bandpass filter having a frequency of 70 GHz can be used, and an interleaver having a frequency of 50 GHz to 100 GHz can be used.

(1.7.2. Example 2 of Frequency Band)

As another example of the optical wavelength multiplexing FSK modulation system according to the present invention, an optical wavelength multiplexing FSK modulation system having $\Delta f_{WDM}$: 100 GHz, $\Delta f_{FSK}$: 12.5 GHz, and $\Delta f_{WDMsig}$: 5 GHz is adopted. In such a system, an optical WDM acquisition unit including a bandpass filter having a frequency of 35 GHz can be used, and an interleaver having a frequency of 25 GHz to 50 GHz can be used.

(2. Acquisition Method of Optical WDM Signal and Optical FSK Modulated Signal)

Steps of acquiring an optical WDM signal and the optical FSK modulated signal by using the optical WDM/FSK modulation system described above will now be described. As described above, as an example of the optical WDM/FSK modulation method, a method including an optical WDM signal output step, an optical FSK signal output step, an optical WDM signal demodulation step, and the optical FSK modulated signal separation step is basically adopted. According to the present invention, any one or both of the optical WDM signal and the optical FSK modulated signal can be acquired.

(2.1. Optical WDM Signal Output Step)

The optical WDM signal output step is a step of causing an optical WDM signal acquisition unit to output an optical WDM signal. As described above, an optical WDM signal output in the optical WDM signal output step is as shown in FIG. 3.

As the frequency interval $\Delta f_{WDM}$ of the WDM signal, a frequency interval of 1 GHz to 200 GHz, 50 GHz to 150 GHz, or 80 GHz to 120 GHz is mentioned. As a value which is half the bandwidth of the optical WDM signal, a value which is ½ $\Delta f_{WDM}$ is mentioned, and a value of 1/100 to 1/5 or 1/50 to 1/10 may be mentioned. More specifically, a value of 5 GHz to 15 GHz or 5 GHz to 10 GHz is mentioned.

(2.2. Optical FSK Signal Output Step)

An optical FSK signal output step is a step of causing the optical WDM signal acquisition unit 2 to perform frequency modulation to an optical WDM signal to acquire an optical FSK signal. As described above, an optical FSK signal output in the optical FSK signal output step is as shown in FIG. 5. As shown in FIG. 5, the optical FSK signal consists of a USB signal 61 and an LSB signal 62 for each optical WDM signal in FIG. 3.

As shown in 5, a center frequency of the optical WDM signal is represented by $f_N$, a center frequency of the USB signal is represented by $f_N+\Delta f_{FSK}$, and a center frequency of the LSB signal is represented by $f_N-\Delta f_{FSK}$. In this case, $\Delta f_{FSK}$ is a width of frequency modulation performed by the optical FSK modulation unit. The frequency $\Delta f_{FSK}$ can be easily controlled by controlling the frequency of a modulated signal applied to the optical FSK modulator. As the frequency $\Delta f_{FSK}$, a frequency of 10 GHz to 50 GHz, 15 GHz to 50 GHz, or 5 GHz to 30 GHz is mentioned.

(2.3. Optical WDM Signal Demodulation Step)

The optical WDM signal modulation step is a step of causing the optical WDM signal demodulation unit to demodulate an optical FSK signal to acquire an optical WDM signal. As shown in FIG. 6, in the optical WDM signal demodulation step, since light of a frequency band obtained by integrating the frequencies of a USB signal and an LSB signal for each WDM signal is transmitted, the optical WDM signal can be demodulated. As described above, by using an optical filter that transmits light of a band including a frequency band in which a frequency upwardly and downwardly shifts from at least a frequency $f_N$ by $(\Delta f_{WDMsig}+\Delta f_{FSK})$, the optical WDM signal can be demodulated. The demodulated optical WDM signal has the same waveform as that of the optical WDM signal shown in FIG. 3. This optical WDM signal is output to a communication path indicated by 9 in FIG. 1. In this manner, in the optical WDM/FSK modulation method according to the present invention, the optical WDM signal is output.

(2.4. Optical FSK Modulated signal Separation Step)

Figure 11:
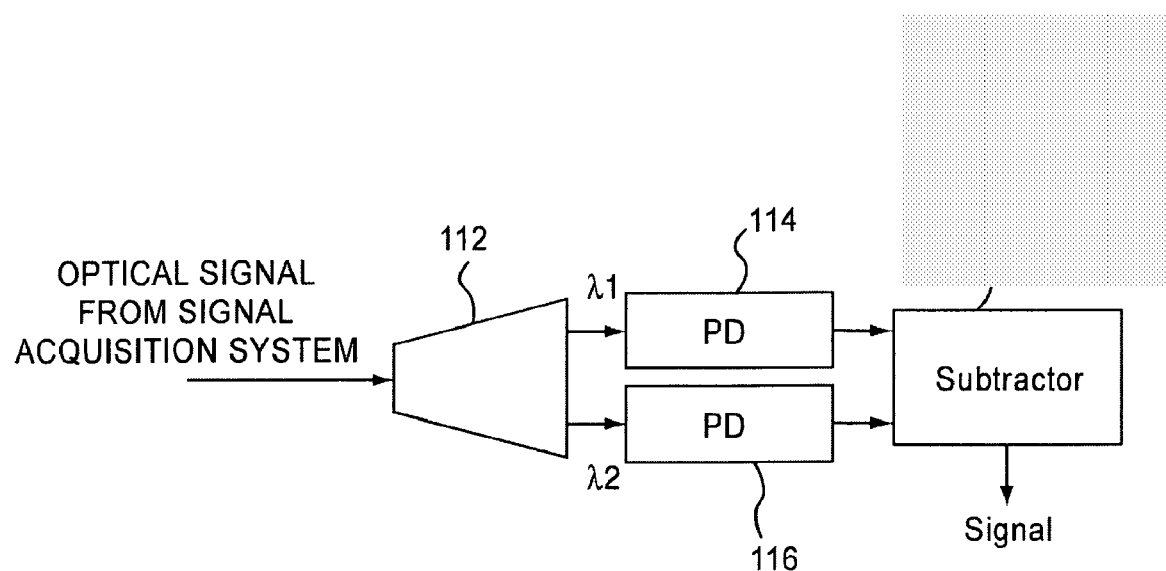
FIG. 11 is a block diagram showing an optical information communication system of the present invention.

The optical FSK modulated signal separation step is a step of causing the optical FSK signal separation unit to separate an optical FSK signal into a USB signal and an LSB signal to acquire an optical FSK modulated signal. The optical FSK modulated signal separation step is performed in parallel with the optical WDM signal demodulation step. As described above, a USB signal separated by the optical FSK signal separation unit is shown in FIG. 7B. This USB signal is output to a communication path indicated by 10 in FIG. 1. Although not especially shown, the LSB signal is acquired like the USB signal and output to a communication path indicated by 11 in FIG. 11. In this manner, in the optical WDM/FSK modulation method according to the present invention, an optical FSK signal is output.

(3. Optical Signal Acquisition System)

In the optical signal acquisition system, FSK information is removed, and an IM signal (or a PM signal) is demodulated in an IM-FSK simultaneous modulation system (or PM-FSK simultaneous modulation system). Since the IM signal is demodulated, a new optical label (FSK signal or the like) can be added at each node of an optical network. An example of the optical signal acquisition system according to the present invention will be described below.

(3.1. Outline of Optical Signal Acquisition System)

Figure 8:
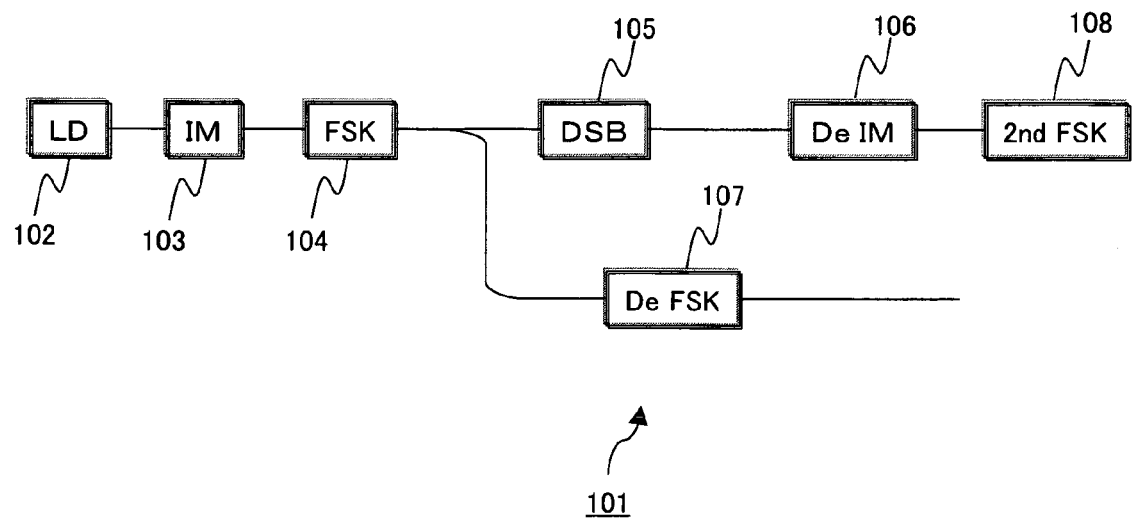
FIG. 8A is a schematic view showing a basic arrangement of an optical signal acquisition system according to the present invention.
FIG. 8B is a schematic view showing a basic arrangement of the optical signal acquisition system shown in FIG. 8A and using an optical PM unit in place of the optical IM unit.
Figure 8:
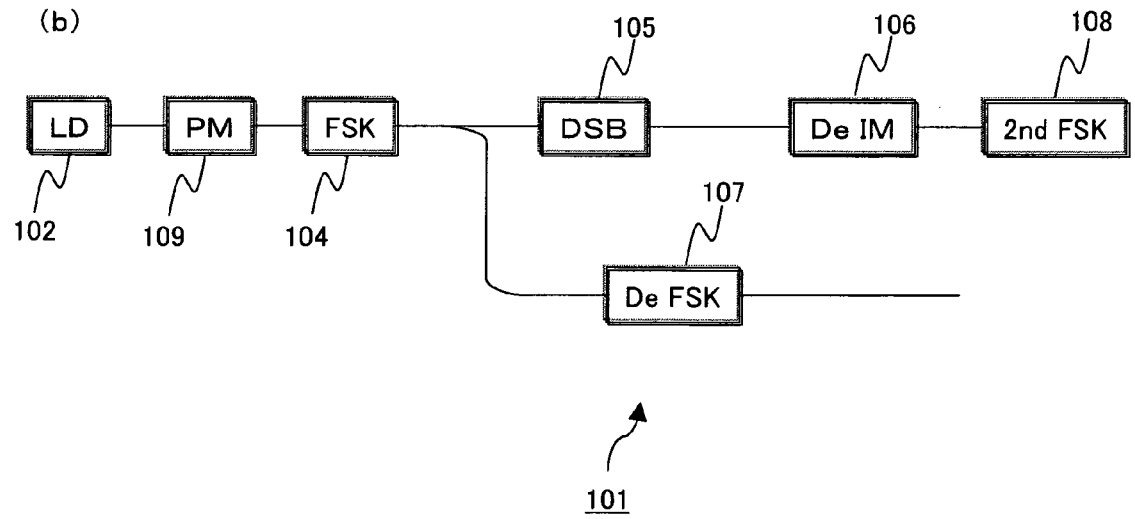

FIGS. 8A and 8B are schematic diagrams showing basic arrangements of the optical signal acquisition system according to the present invention. As shown in FIG. 8A, as an optical signal acquisition system 101 according to the present invention, optical signal acquisition system including a laser light source 102, an optical IM unit 103, an optical FSK modulation unit 104, a DSB modulation unit 105, and an optical IM signal separation unit 106 is adopted. The optical signal acquisition system according to the present invention preferably includes an FSK demodulation unit 107 and a second optical FSK modulation unit 108. The respective components will be described below.

(3.2. Laser Light Source)

The laser light source 102 is a device to generate laser light. In a conventional optical FSK system, a wavelength of a laser itself generated from a laser light source is changed. However, in the optical signal acquisition system according to the present invention, since an optical FSK modulation unit such as an optical FSK modulator is used, an output of the laser light source can be kept constant. In this manner, IM is possible. As the laser light source, a semiconductor laser is adopted. A laser device in which a light intensity modulator is incorporated may also be used.

A frequency $f_0$ of light output from the laser light source is preferably set at 100 THz or more because a stable laser can be used. The frequency $f_0$ is more preferably set at 170 THz or more because an existing fiber can be used. The frequency $f_0$ is particularly preferably set at 190 to 250 THz because low-loss transmission can be achieved by using a fiber.

As an intensity of light output from the laser light source, an intensity of 0.1 mW or more is mentioned, an intensity of 1 mW or more is preferably mentioned, and an intensity of 10 mW or more is more preferably mentioned.

Another preferable embodiment of the present invention uses the optical wavelength multiplexing signal acquisition unit described above. In this case, a plurality of laser light sources may be used. In this case, as described above, a center frequency of each optical wavelength multiplexing signal is set at $f_N$. The frequency $f_N$ may be periodical or may not be periodical. In this manner, the center frequency of an optical signal is $f_0$ when a single light signal is used, and the center frequency of an optical signal is $f_N$ when an optical wavelength multiplexing signal is used as an optical signal. However, these frequencies will be collectively expressed by $f_0$ in the following description.

(3.3. Light Intensity Modulation Unit)

The optical IM unit 103 is a unit to modulate an intensity of laser light from the laser light source. As the opticalIM unit 103, a known light intensity modulator can be adopted. As such a light intensity modulator, an LN modulator or the like is mentioned. An amplitude of laser light is modulated by the light intensity modulator. A value which is half a bandwidth of the laser light modulated at this time is represented by $\Delta f_{sig}$ in this specification. As the light intensity modulator, a light intensity modulator which is directly incorporated in the laser device to directly modulate laser light may be adopted. However, a light intensity modulator arranged independently of the laser light source is preferably adopted. In place of the light intensity modulation unit, or together with the light intensity modulation unit, an optical phase modulation unit may be used. In this case, an optical IM signal is an optical PM signal or an optical IM/PM signal. When the optical signal is an optical wavelength multiplexing signal, $\Delta f_{WDMsig}$ is used in place of $\Delta f_{sig}$. However, these frequencies are collectively expressed by $\Delta f_{sig}$.

(3.4. Optical FSK Modulation Unit)

The optical FSK modulation unit 104 is a unit that performs frequency modulation to an optical signal to acquire an optical FSK signal including a USB signal and an LSB signal. As the optical FSK modulation unit, the optical FSK modulation unit described above can be used.

(3.5. Double Side Band Modulation Unit)

The DSB modulation unit 105 is a unit that performs double side band (DSB) modulation to an IM/FSK modulated signal modulated by the optical IM unit and the optical FSK modulation unit to acquire a double side band signal. As the DSB modulation unit, a double side band carrier wave suppression modulation unit is preferably used. This is because, by using the double side band carrier wave suppression (DSB-SC) modulation unit, a carrier wave component except for waves of a double side band can be suppressed to make it easy to separate a signal.

In still another embodiment of the present invention, an optical phase modulation unit is used in place of the double side band carrier wave suppression modulation unit in the optical signal acquisition system. When the optical phase modulation unit such as an optical phase modulator is used, a double side band signal can be obtained by a relatively simple device. Furthermore, in still another embodiment of the present invention, a light intensity modulation unit is used in place of the double side band carrier wave suppression modulation unit. A double side band signal can also be used by using the optical phase modulation unit or the light intensity modulation unit. However, a carrier wave component is left as a signal without being suppressed.

(3.6. Light Intensity Modulation Signal Separation Unit)

The optical IM signal separation unit is a unit to separate an optical IM signal component from an output signal from the DSB modulation unit. As the optical IM signal separation unit, an optical filter that has a center frequency of $f_0$ and transmits light in a predetermined region or an optical filter having a center frequency $f_0$ and a bandwidth expressed by $2\Delta f_{sig}$ is mentioned. More specifically, as the optical filter, an optical filter having a bandwidth which is equal to an occupied frequency band of a light intensity signal.

(3.7. FSK Demodulation Unit)

The FSK demodulation unit 107 is a unit to demodulate an FSK modulation component of an IM/FSK modulated signal.

(3.8. Second Optical FSK Modulation Unit)

The second optical FSK modulation unit 108 is a unit that performs frequency modulation to an optical signal output from the optical IM signal separation unit to acquire an optical FSK signal including a USB signal and an LSB signal. When the second optical FSK modulation means is used, an FSK modulated signal (label signal or the like) can be superposed on optical information temporarily demodulated into an IM signal again.

(4. Operation of Optical Signal Acquisition System)

An optical signal acquisition system according to the present invention is basically obtained by removing FSK signal and demodulating an IM signal in the IM/FSK simultaneous modulation system.

(4.1. Outline of Optical Signal Acquisition Method)

In an optical signal acquisition method according to the present invention, an optical signal is basically obtained through an optical IM step, an optical FSK modulation step, a DSB-SC modulation step, and an optical IM signal separation step. Another example of the optical signal acquisition method according to the present invention, an optical signal may be obtained by a step including an FSK demodulation step and a second optical FSK modulation step. The steps will be described below. The optical IM step and the optical FSK step may be performed in any order.

(4.2. Light Intensity Modulation Step)

The optical IM step is a step to modulate an intensity of laser light from a laser light source. An increase in number of stages of the IM can increase the number of pieces of information to be given.

(4.3. Optical FSK Modulation Step)

The optical FSK modulation step is a step of performing frequency modulation to an optical signal to acquire an optical SFK signal including a USB signal and an LSB signal. More specifically, in this step, the USB signal or the LSB signal can be selectively output. A center frequency of the USB signal is $f_0 + \Delta f_{FSK}$, and a center frequency of the LSB signal is $f_0 - \Delta f_{FSK}$. When an optical WDM signal is used in place of laser light, and when a center frequency of each optical WDM signal is represented by $f_N$, center frequencies of the USB signal and the LSB signal are represented by $f_N + \Delta f_{FSK}$ and $f_N - \Delta f_{FSK}$, respectively.

(4.4. Double Side Band Modulation Step)

Figure 9:
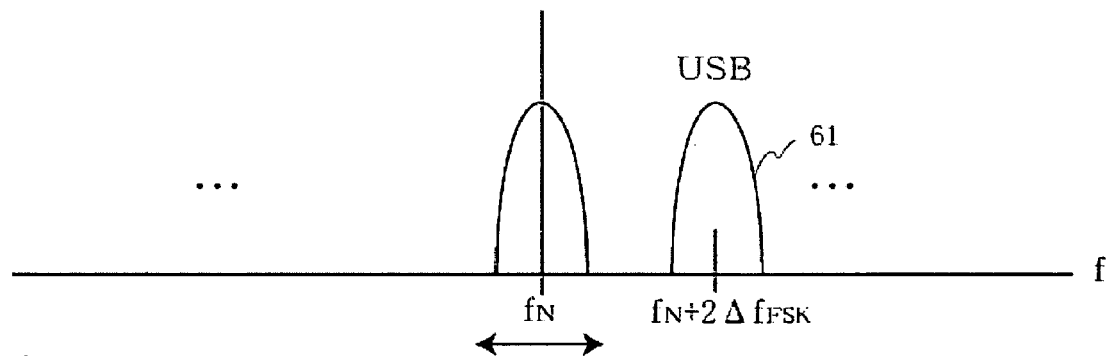
Figure 9:
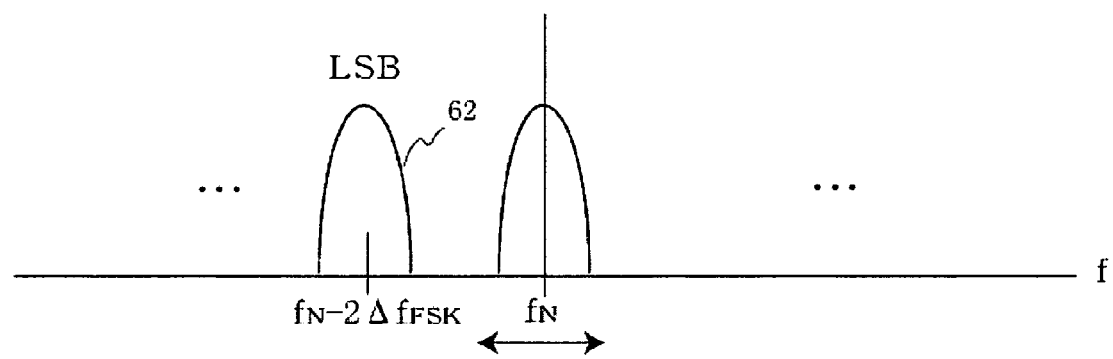
Figure 9:
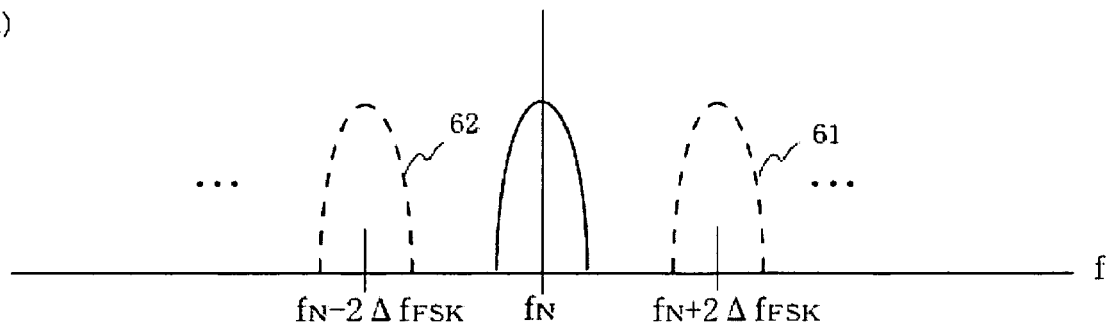

The DSB modulation step is a step to perform double side band (DSB) modulation to an IM/FSK modulated signal modulated by the optical IM unit and the optical FSK modulation unit. FIGS. 9A, 9B, and 9C are conceptual diagrams showing spectra of optical signals subjected to the double side band carrier wave suppression (DSB-SC) modulation.

As shown in FIG. 9A, when an output in the optical FSK modulation step is a USB signal, a signal (USB) having a center frequency $f_0 + 2\Delta f_{FSK}$ and a signal (LSB) having a center frequency of $f_0$ are output at once. On the other hand, as shown in FIG. 9b, when an output in the optical FSK modulation step is an LSB, a signal (USB) having a center frequency $f_0$ and a signal (LSB) having a center frequency of $f_0 - 2\Delta f_{FSK}$ are output at once. When an optical phase modulator and a light intensity modulator are used in the double side band modulation step, a signal having a center frequency $f_0 + \Delta f_{FSK}$ and a signal having a center frequency of $f_0 - \Delta f_{FSK}$ are also output.

(4.5. Light Intensity Modulated Signal Separation Step)

The optical IM signal separation step is a step to separate an optical IM signal component from an output in the DSB modulation step. As described above, in the DSB modulation step, a signal (USB) having a center frequency $f_0 + 2\Delta f_{FSK}$ and a signal (LSB) having a center frequency of $f_0$ may be output at once, or a signal (USB) having a center frequency $f_0$ and a signal (LSB) having a center frequency of $f_0 - 2\Delta f_{FSK}$ may be output at once. More specifically, in any case, a signal having the center frequency $f_0$ is output. Therefore, in the optical IM signal separation step, light in regions indicated by arrows in FIGS. 9A and 9B are extracted to make it possible to extract a signal component having the center frequency $f_0$ as shown in FIG. 9C. In this manner, the optical IM signal can be demodulated.

(4.6. FSK Demodulation Step)

The FSK demodulation step is a step to demodulate an FSK modulation component of the IM/FSK modulated signal. As the FSK demodulation step, a step separates an optical signal into a USB signal and an LSB signal by using an optical FSK signal separation unit such as the interleaver described above.

(4.7. Second Optical FSK Modulation Step)

The second optical FSK modulation step is a step of performing frequency modulation to an optical signal output from the optical IM signal separation unit to acquire an optical FSK signal including a USB signal and an LSB signal. According to the second optical FSK modulation step, an FSK modulated signal can be superposed on optical information temporarily demodulated into an IN signal again.

(5. Another Optical Signal Acquisition System)

Another optical signal acquisition system different from the above-mentioned optical signal acquisition system according to the present invention is obtained such that a basic signal is acquired by using an optical phase modulation (PM) unit or a combination of an optical IN unit and an optical PM unit in place of the optical IM unit (103) in the optical signal acquisition system. FIG. 9B shows a basic arrangement of an optical signal acquisition system using the optical PM unit. These systems operate like the optical signal acquisition system described above.

(6. Another Optical Signal Acquisition System)

Figure 10:
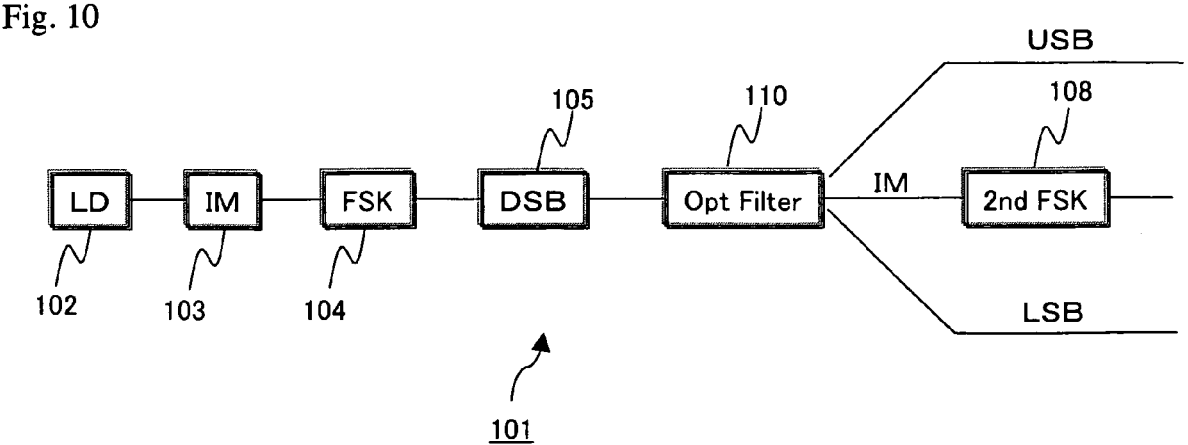
FIG. 10 is a schematic view showing an example of an optical signal acquisition system.

As shown in FIG. 10, as an optical signal acquisition system 101 according to another concrete example of the present invention, an optical signal acquisition system including a laser light source 102, an optical IN unit 103, an optical FSK modulation unit 104, a DSB modulation unit 105, and an optical filter unit 110 is mentioned. The optical signal acquisition system preferably includes a second optical FSK modulation unit 108 used to superpose label information again.

(6.1. Outline of Optical Signal Acquisition System)

In the optical signal acquisition system 101, the laser light source 102, the optical IN unit 103, the optical FSK modulation unit 104, and the DSB modulation unit 105 are the same as those described above. These components function in the same ways as those of the components described above.

As the laser light source, the optical wavelength multiplexing signal acquisition unit described above may be used. More specifically, when a WDM signal is used as an optical signal input to the DSB modulation unit, the WDM signal can be demodulated.

An optical PM unit and an optical IM/PM unit may be used in place of the optical IM unit. Also in the optical signal acquisition system, when an IM signal, a PM signal, and an IM/PM signal are used as optical signals input to the DSB modulation unit, the IM signal, the PM signal, and the IM/PM signal can be demodulated. In addition, since any one or both of the LSB signal and the USB signal can be extracted, an FSK signal can be demodulated.

The optical filter unit 110 is a unit to transmit an optical signal which is present in a predetermined frequency region. As the optical filter unit, an optical filter that transmits light in a predetermined region having, as a center frequency, a center frequency $f_0$ ($f_N$ in case of a wavelength multiplexing signal) of an optical signal from the laser light source is mentioned. When such an optical filter unit is used, an IM signal (PN signal or IM/PM signal) can be demodulated. As another example of the optical filter unit, an optical filter having a bandwidth which is equal to an occupied frequency bandwidth of a light intensity signal of output light from a double side band modulation unit is mentioned. When such an optical filter unit is used, an IM signal (PM signal or IM/PM signal) can be more reliably demodulated.

As still another example of the optical filter, an optical filter that transmits any one or all of a signal having a center frequency of $f_0$ ($f_N$ in case of a wavelength multiplexing signal), a signal having a center frequency of $f_0-2\Delta f_{FSK}$ ($f_N-2\Delta f_{FSK}$ in case of the wavelength multiplexing signal), and a signal having a center frequency of $f_0+2\Delta f_{FSK}$ ($f_N+2\Delta f_{FSK}$ in case of the wavelength multiplexing signal) is mentioned. When such an optical filter unit is used, not only an IM signal (PM signal or IM/PM signal) but also an FSK signal (label information or the like) can be demodulated. As a concrete example of the optical filter unit, an interleaver is mentioned, and an interleaver having a frequency of 25 GHz to 100 GHz may be used.

(7. Optical Information Communication System)

As an optical information communication system according to the present invention, an optical information communication system including the optical signal acquisition system described above, a branching unit 112 for branching an optical signal output from the optical signal acquisition system depending on the frequency of the optical signal, a first photodetector 114 for detecting one of the optical signals branched by the branching unit 112, a second photodetector 116 for detecting the other of the optical signals branched by the branching unit 112, and a subtractor 118 for calculating a difference between an output signal from the first photodetector 114 and an output signal from the second photodetector 116 is mentioned.

(7.1. Branching Unit)

The branching unit 112 is a device that branches an optical signal depending on the wavelength or the frequency of the optical signal. As the branching unit 112, a known branching unit can be adopted.

(7.2. Photodetector)

The photodetectors 114, 116 are devices to detect an optical signal. As the photodetectors 114, 116, a known photodetector can be adopted. As the photodetectors 114, 116, for example, a device including a photodiode can be adopted. As the photodetectors 114, 116, a photodetector that detects an optical signal to convert the optical signal into an electric signal is mentioned. An intensity or the like of an optical signal can be detected by the photodetectors 114, 116.

(7.3. Subtractor)

The subtractor 118 is a device including a calculating circuit which calculates a difference between an output signal from the first photodetector 114 and an output signal from the second photodetector 116. As the subtractor 118 a known subtractor can be adopted.

Since the optical WDM/FSK modulation system according to the present invention can simultaneously output an optical WDM signal and an optical FSK modulated signal, the system is used as an optical communication system which can transmit information the amount of which is larger than that of a conventional optical information communication system.

The optical signal acquisition system according the present invention is used as an optical information communication system.

What is claimed is:

1. An optical wavelength multiplexing frequency shift keying modulation system comprising:
   optical wavelength multiplexing signal acquisition means for outputting an optical wavelength multiplexing signal;
   optical frequency shift keying modulation means for acquiring an optical frequency shift keying signal including an upper side band signal and a lower side band signal by performing frequency modulation to the optical wavelength multiplexing signal output from the optical wavelength multiplexing signal acquisition means; and
   optical frequency shift keying signal separation means for separating the optical frequency shift keying signal output from the optical frequency shift keying modulation means into an upper side band signal and a lower side band signal; and wherein
   an optical wavelength multiplexing signal output from the optical wavelength multiplexing signal acquisition means is subjected to frequency modulation by the optical frequency shift keying modulation means to obtain an optical frequency shift keying signal, and the optical frequency shift keying signal separation means separates the optical frequency shift keying signal into an upper side band signal and a lower side band signal to obtain an optical frequency shift keying modulation signal.

2. The optical wavelength multiplexing frequency shift keying modulation system according to claim 1, comprising optical wavelength multiplexing signal demodulation means for demodulating the optical frequency shift keying signal output from the optical frequency shift keying modulation means into an optical wavelength multiplexing signal, and wherein
   the optical wavelength multiplexing demodulation means demodulates an optical wavelength multiplexing signal.

3. The optical wavelength multiplexing frequency shift keying modulation system according to claim 2, wherein
   the optical wavelength multiplexing signal demodulation means includes an optical filter which transmits light having a predetermined frequency region, and when a frequency interval of optical wavelength multiplexing signals output from the optical wavelength multiplexing signal acquisition means is represented by $\Delta f_{WDM}$, when a band width of each optical wavelength multiplexing signal is represented by $2\Delta f_{WDMsig}$, and when a frequency deviation performed by the optical frequency shift keying modulation means is represented by $\Delta f_{FSK}$, the optical filter composing the optical wavelength multiplexing signal demodulation means is a filter which transmits light of a frequency band that includes at least a frequency shifts upwardly and downwardly by $(\Delta f_{WDM}sig+\Delta f_{FSK})$ from a center frequency of each optical wavelength multiplexing signal output from the signal acquisition means.

4. The optical wavelength multiplexing frequency shift keying modulation system according to claim 3, wherein the frequency interval between the optical wavelength multiplexing signals, the band width of each optical wavelength multiplexing signal, and the frequency deviation performed by the optical frequency shift keying modulation means satisfy the following relational expression (1):

$$\Delta f_{WDM} > \Delta f_{WDMsig} + \Delta f_{FSK} \qquad (1).$$

5. The optical wavelength multiplexing frequency shift keying modulation system according to claim 1, wherein the optical frequency shift keying signal separation means includes any one of upper side band signal separation means for separating an upper side band signal and lower side band signal separation means for separating a lower side band signal.

6. The optical wavelength frequency shift keying modulation system according to claim 1, wherein
the optical frequency shift keying signal separation means includes both an upper side band signal separation means for separating an upper side band signal and lower side band signal separation means for separating a lower side band signal.

7. The optical wavelength multiplexing frequency shift keying modulation system according to claim 5 or claim 6, wherein
the upper side band signal separation means is a means which transmits light included in a predetermined region in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $+\Delta f_{FSK}$, and
the lower side band signal separation means is a means which transmits light included in a predetermined region in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $-\Delta f_{FSK}$.

8. The optical wavelength multiplexing frequency shift keying modulation system according to claim 5 or claim 6, wherein
the upper side band signal separation means is a means which transmits light in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $+\Delta f_{FSK}$, and
the lower side band signal separation means is a means which transmits light in a frequency band in which a frequency upwardly and downwardly shifts from at least a center frequency by $\Delta f_{WDMsig}$, the center frequency being at a frequency position shifting from a center frequency of each optical wavelength multiplexing signal output from the optical wavelength multiplexing signal acquisition means by $-\Delta f_{FSK}$.

9. The optical wavelength multiplexing frequency shift keying modulation system according to claim 1, wherein the optical frequency shift keying signal separation means includes an interleaver.

10. An optical wavelength multiplexing frequency shift keying modulation method comprising:
the step of outputting an optical wavelength multiplexing signal;
the step of performing frequency modulation to the optical wavelength multiplexing signal to obtain an optical frequency shift keying signal;
the step of demodulating the optical frequency shift keying signal into an optical wavelength multiplexing signal to obtain an optical wavelength multiplexing signal; and
the step of separating the optical frequency shift keying signal into an upper side band signal and a lower side band signal to obtain an optical FSK modulated signal.

11. An optical signal acquisition system comprising:
light intensity modulation means for modulating an intensity of an optical signal from a laser light source;
optical frequency shift keying modulation means for performing frequency modulation to an optical signal to obtain an optical frequency shift keying signal including an upper side band signal and a lower side band signal;
double side band modulation means for performing double side band modulation to an intensity modulated-and-frequency shift keying modulated signal modulated by the light intensity modulation means and the optical frequency shift keying modulation means; and
light intensity modulated signal separation means for separating a light intensity modulated signal component from an output signal from the double side band modulation means.

12. The optical signal acquisition system according to claim 11, wherein
the optical signal from the laser light source includes optical frequency multiplexing signals output from a plurality of laser light sources, and
the light intensity modulation means is arranged for each optical wavelength multiplexing signal.

13. The optical signal acquisition system according to claim 11, wherein
the double side band modulation means is any one of a double side band carrier wave suppression modulation means, phase modulation means, and intensity modulation means.

14. The optical system acquisition system according to claim 11, wherein
when a frequency deviation by a shift keying modulation means is represented by $\Delta f_{FSK}$, a modulation frequency of the double side band modulation means is $\Delta f_{FSK}$.

15. The optical signal acquisition system according to claim 11, wherein
the light intensity modulated signal separation means is an optical filter which transmits light in a predetermined region having, as a center frequency, a center frequency $f_0$ ($f_N$ which is a center frequency of a signal when the signal is a frequency multiplexing signal) of an optical signal from the laser light source.

16. The optical signal acquisition system according to claim 15, wherein
the optical filter is an optical filter having a band width equal to an occupied frequency band width of a light intensity signal.

17. The optical signal acquisition system according to claim 11, further comprising:
frequency shift keying demodulation means for demodulating a frequency shift keying modulation component of the intensity modulated-and-frequency shift keying modulated signal.

18. The optical signal acquisition system according to claim 11, comprising
second optical frequency shift keying modulation means for performing frequency modulation to an optical signal output from the light intensity modulation signal separation means to obtain an optical frequency shift keying signal including an upper side band signal and a lower side band signal.

19. An optical signal acquisition system comprising:
optical phase modulation means for modulating a phase of an optical signal from a laser source;

optical frequency shift keying modulation means for performing frequency modulation to the optical signal to obtain an optical frequency shift keying signal including an upper side band signal and a lower side band signal;

double side band modulation means for performing double side band modulation to a phase modulated/frequency shift keying modulated signal modulated by the optical phase modulation means and the optical frequency shift keying modulation means; and optical phase modulated signal separation means for separating an optical phase modulated signal component from an output signal of the double side band modulation means.

20. The optical signal acquisition system according to claim 19, wherein
the optical signal from the laser light source is an optical wavelength multiplexing signal output from a plurality of laser light sources, and
the optical phase modulation means is arranged for each of the optical wavelength multiplexing signals.

21. The optical signal acquisition system according to claim 19, wherein
the double side band modulation means is any one of double side band carrier wave suppression modulation means, phase modulation means, and intensity modulation means.

22. The optical signal acquisition system according to claim 19, wherein
when a frequency deviation by a shift keying modulation means is represented by $\Delta f_{FSK}$, a modulation frequency of the double side band modulation means is $\Delta f_{FSK}$.

23. The optical signal acquisition system according to claim 19, wherein
the light phase modulated signal separation means is an optical filter which transmits light in a predetermined region having, as a center frequency, a center frequency $f_0$ ($f_N$ when the signal is a frequency multiplexing signal) of an optical signal from the laser light source.

24. The optical signal acquisition system according to claim 23, wherein
the optical filter is an optical filter having a band width equal to an occupied frequency band width of a light phase signal.

25. The optical signal acquisition system according to claim 19, further comprising
frequency shift keying demodulation means for demodulating a frequency shift keying modulation component of the phase modulated/frequency shift keying modulated signal.

26. The optical signal acquisition system according to claim 19, comprising
second optical frequency shift keying modulation means for performing frequency modulation to an optical signal output from the optical phase modulated signal separation means to obtain an optical frequency shift keying signal including an upper side band signal and a lower side band signal.

27. An optical signal acquisition system comprising:
light intensity modulation means for modulating an intensity of an optical signal from a laser light source;
optical frequency shift keying modulation means for performing frequency modulation to an optical signal to obtain an optical frequency shift keying signal including an upper side band signal and a lower side band signal;
double side band modulation means for performing double side band modulation to an intensity modulated-and-frequency shift keying modulated signal modulated by the light intensity modulation means and the optical frequency shift keying modulation means; and
optical filter means for separating an output signal from the double side band modulation means.

28. The optical signal acquisition system according to claim 27, wherein
the optical signal from the laser light source includes an optical wavelength multiplexing signals output from a plurality of laser light sources, and
the light intensity modulation means is arranged for each of the optical wavelength multiplexing signals.

29. The optical signal acquisition system according to claim 27, wherein
the double side band modulation means is any one of a double side band carrier wave suppression modulation means, phase modulation means, and intensity modulation means.

30. The optical system acquisition system according to claim 27, wherein
when a frequency deviation by a shift keying modulation means is represented by $\Delta f_{FSK}$, a modulation frequency of the double side band modulation means is $\Delta f_{FSK}$.

31. The optical signal system according to claim 27, wherein
in place of the light intensity modulation means, optical phase modulation means; or both optical phase modulation means and light intensity modulation means; are used.

32. The optical signal acquisition system according to claim 27, wherein
the optical filter means includes an optical filter which transmits light in a predetermined region having, as a center frequency, a center frequency $f_0$ ($f_N$ when the signal is a frequency multiplexing signal) of an optical signal from the laser light source.

33. The optical signal acquisition system according to claim 27, wherein
the optical filter means is an optical filter having a band width equal to an occupied frequency band width of a light intensity signal of output light from the double side band modulation means.

34. The optical signal acquisition system according to claim 27, wherein
the optical filter means is an optical filter which transmits a signal having a center frequency of $f_0$ ($f_N$ when the signal is a wavelength multiplexing signal) and any one or both of a signal having a center frequency of $f_0 - 2\Delta f_{FSK}$ ($f_N - 2\Delta f_{FSK}$ when the signal is a wavelength multiplexing signal) and a signal having a center frequency of $f_0 + 2\Delta f_{FSK}$ ($f_N + 2\Delta f_{FSK}$ when the signal is a wavelength multiplexing signal).

35. The optical signal acquisition system according to claim 27, further comprising
frequency shift keying demodulation means for demodulating a frequency shift keying modulation component of the intensity modulated-and-frequency shift keying modulated signal.

36. The optical signal acquisition system according to claim 27, comprising
second optical frequency shift keying modulation means for performing frequency modulation to an optical signal output from the light intensity modulated signal separation means to obtain an optical frequency shift keying signal including an upper side band signal and a lower side band signal.

37. An optical information communication system comprising:

an optical signal acquisition system according to any one of claims 11, 19 and 27 branching means for branching an optical signal output from the optical signal acquisition system into optical signals depending on frequencies thereof;

a first photodetector for detecting one of the optical signals branched by the branching means;

a second photodetector for detecting the remaining one of the optical signals branched by the branching means; and a subtractor for calculating a difference between an output signal from the first photodetector and an output signal from the second photodetector.

* * * * *